United States Patent [19]

Ohmori et al.

[11] Patent Number: 4,622,364
[45] Date of Patent: Nov. 11, 1986

[54] FLUORINE-CONTAINING COPOLYMER AND COMPOSITION CONTAINING THE SAME

[75] Inventors: Akira Ohmori, Ibaraki; Nobuyuki Tomihashi, Takatsuki; Yoshiki Shimizu, Settsu, all of Japan

[73] Assignee: Daikin Kogyo Co., Ltd., Osaka, Japan

[21] Appl. No.: 817,330

[22] Filed: Jan. 9, 1986

Related U.S. Application Data

[62] Division of Ser. No. 722,560, Apr. 12, 1985, Pat. No. 4,588,781, which is a division of Ser. No. 599,134, Apr. 11, 1984, Pat. No. 4,529,785.

[51] Int. Cl.$^4$ .............................................. C08L 27/12
[52] U.S. Cl. .................................................. 525/200
[58] Field of Search ........................................ 525/200

[56] References Cited

U.S. PATENT DOCUMENTS 4,252,859  2/1981  Concannon et al. ................ 525/200
4,454,249  6/1984  Suzuki et al. ...................... 525/200
4,510,279  4/1985  Kishimura et al. ................. 525/200

*Primary Examiner*—Harry Wong, Jr.
*Attorney, Agent, or Firm*—Armstrong, Nikaido, Marmelstein & Kubovcik

[57] ABSTRACT

A fluorine-containing copolymer comprising chlorotrifluoroethylene, 2,2,3,3-tetrafluoropropyl vinyl ether and 0 to 25% by mole of a vinyl ether having a functional group selected from the group consisting of hydroxyl group, glycidyl group and amino group. The fluorine-containing copolymer has a good compatibility with methyl methacrylate polymers and gives, in combination use with methyl methacrylate polymers, products such as coating film, self-supporting film and molded article, which have good stain resistance and transparency.

The fluorine-containing copolymer is preferably an alternating copolymer comprising chlorotrifluoroethylene and 2,2,3,3-tetrafluoropropyl vinyl ether.

2 Claims, No Drawings

FLUORINE-CONTAINING COPOLYMER AND COMPOSITION CONTAINING THE SAME

This is a division of application Ser. No. 722,560, filed Apr. 12, 1985, now U.S. Pat. No. 4,588,781, which is in turn a division of application Ser. No. 599,134 filed Apr. 11, 1984 and issued as U.S. Pat. No. 4,529,785 on July 16, 1985.

BACKGROUND OF THE INVENTION

The present invention relates to a novel fluorine-containing copolymer and a composition containing the same suitable for coating, forming or molding.

Paints containing fluorine-containing polymers as a base material give coating films excellent in chemical resistance, weatherability, stain resistance, heat resistance, and the like, and they are used in a variety of uses wherein such excellent properties are sufficiently exhibited.

However, usual fluorine-containing polymers have poor solubilities in solvents and, even if they are soluble in solvents, the kinds of solvents to be used are limited. Further, since the usable solvents have high boiling points, heat treatment at high temperature is required after coating.

To overcome those disadvantages, there has been proposed the use of fluorine-containing polymers in combination with methyl methacrylate polymers. However, vinylidene fluoride polymers are the only polymers that have been found heretofore as a fluorine-containing polymer capable of being mixed uniformly with methyl methacrylate polymers, with the exception of fluorine-containing methacrylate copolymers having a low fluorine content. Generally, solvents capable of dissolving the vinylidene fluoride polymers are limited to special solvents having a high boiling point, such as N,N-dimethylformamide and N,N-dimethylacetamide, which require high temperature for drying a coating. A commercially available paint containing a vinylidene fluoride polymer and a methyl methacrylate polymer must be baked at a high temperature to obtain a coating film.

Recently, research for development of a fluorine-containing resin paint which is curable at room temperature and does not require high temperature baking has been conducted. For instance, attempts were made to obtain a fluorine-containing copolymer having an improved solubility which is prepared by copolymerizing vinylidene fluoride and other fluorine-containing monomers such as tetrafluoroethylene, hexafluoropropylene and chlorotrifluoroethylene. However, since vinylidene fluoride has a poor copolymerizability, a fluorine-containing comonomer used as a functional monomer imparting room temperature curability to the resulting copolymer is limited to a special one. It is the present situation that no practical fluorine-containing polymer curable at room temperature is obtained.

There has been also proposed a copolymer of fluoroolefin, cyclohexyl vinyl ether and other comonomer for paint curable at room temperature paint (see Japanese Unexamined Patent Publication Nos. 55-25414, 57-34107 and 57-34108). However, this copolymer has a problem that it cannot be blended uniformly with a methyl methacrylate polymer having good transparency.

A solution containing a fluoroolefin copolymer having hydroxylalkyl groups, (which is prepared, for instance, by solution-polymerization of hydroxyalkyl vinyl ether with fluoroolefin, and if needed, also with alkyl vinyl ether or fluoroalkyl vinyl ether), is used as it is or after dilution with aromatic hydrocarbons or thinners for paints, as a base resin for room temperature curing paints.

Paints using the fluoroolefin copolymer as a base resin give coating films having excellent properties inherent in fluorine-containing polymers as mentioned above, but, generally, they are poor in storage stability, that is, they tend to generate acids which lower the pH value thereof to cause gelation.

On the other hand, methyl methacrylate polymers are widely used in a variety of products such as lighting apparatuses, household electric appliances, instrumental boards, parts of automobiles and containers, due to their high transparency. However, the methyl methacrylate polymers have a drawback in that the transparency thereof is liable to be lowered by staining due to their poor stain resistance.

Heretofore, as to methyl methacrylate polymers, much research has been conducted to improve the stain resistance and lower the refractive index with retaining the excellent transparency. However, the only method found heretofore use, in combination with the methyl methacrylate polymers, vinylidene fluoride polymers which have a drawback in that they are soluble in only specific solvents.

SUMMARY OF THE INVENTION

It is an object of the present invention to provide fluorine-containing copolymers which can be blended uniformly with methyl methacrylate polymers.

A further object of the invention is to provide fluorine-containing copolymers having functional groups which can be used as a base resin for paints curable at room temperature.

Another object of the invention is to provide a fluorine-containing copolymer having functional groups which can be blended uniformly with methyl methacrylate polymers, and can be used as a base resin for paints curable at room temperature.

Still another object of the invention is to provide a polymer blend composition, from which a coating film, self-supporting film or molded article having an excellent stain resistance, a high transparency and a low refractive index can be obtained in good processability.

Further still another object of the invention is to provide a curable resin composition which is used as a base for paints curable at room temperature and from which a coating film having an excellent stain resistance as well as excellent chemical resistance and weatherability.

Further still another object of the invention is to provide a fluorine-containing resin composition for paints having a good storage stability.

These and other objects of the invention will become apparent from the description hereinafter.

It has now been found that the above-mentioned objects can be accomplished by a fluorine-containing copolymer comprising chlorotrifluoroethylene, 2,2,3,3-tetrafluoropropyl vinyl ether and 0 to 25% by mole of a vinyl ether having a hydroxyl group, a glycidyl group or an amino group.

DETAILED DESCRIPTION

The fluorine-containing copolymer of the present invention is classified into the following two groups.

One group is a fluorine-containing copolymer comprising chlorotrifluoroethylene and 2,2,3,3-tetrafluoropropyl vinyl ether (hereinafter this copolymer is referred to as "copolymer I"), and the other group is a fluorine-containing copolymer comprising chlorotrifluoroethylene, 2,2,3,3-tetrafluoropropyl vinyl ether and a vinyl ether having a hydroxyl group, a glycidyl group or an amino group (hereinafter this vinyl ether is referred to as "functional vinyl ether"), the content of the functional vinyl ether being preferably from 0.5 to 25% by mole (hereinafter this copolymer is referred to as "copolymer II").

The copolymer I is preferably an alternating copolymer of chlorotrifluoroethylene and 2,2,3,3-tetrafluoropropyl vinyl ether. The alternating copolymer has a glass transition temperature of about 33° C. [determined with differential scanning calorimeter (hereinafter referred to as "DSC")], a thermal decomposition temperature (the temperature of which a given weight of the copolymer begins to be reduced) of about 263° C., a refractive index ($n_D^{20}$) of about 1.400, a critical surface tension of about 25 dyn/cm and a light transmittance (the transmittance of lights ranging from 400 to 800 nm through a sheet having a thickness of 1 mm) of about 93.5%.

The alternating copolymer is an amorphous polymer and has an excellent transparency. The alternating copolymer is soluble into solvents into which methyl methacrylate polymers are soluble, for instance, methyl ethyl ketone, acetone, methyl isobutyl ketone, diisobutyl ketone, ethyl acetate, butyl acetate, ethylene glycol monomethyl ether, dimethylformamide, dimethylacetamide, or other ketone solvents or ester solvents.

The alternating copolymer is obtained by mixing chlorotrifluoroethylene with 2,2,3,3-tetrafluoropropyl vinyl ether in a ratio of the former to the latter of from 40/60 to 60/40 by mole, preferably from 45/55 to 55/45 by mole and subjecting the mixture to polymerization reaction at 0° to 100° C. in the absence of oxygen. The polymerization reaction may be carried out in the presence of a solvent. Examples of the preferred solvent are trichlorotrifluoroethane, 1,1,2,2-tetrachloro-1,2-difluoroethane, methyl ethyl ketone and ethyl acetate. The amount of the solvent used varies depending upon the kind thereof but usually the amount is from 100 to 400 parts (parts by weight, the same as hereinafter) on the basis 100 parts of the resulting copolymer. In the above polymerization reaction, there are used usual polymerization initiators such as azobisisobutyronitrile, diisopropyl peroxydicarbonate, isobutylol peroxide, benzoyl peroxide and tert-butyl peroxyisobutyrate. The amount of the polymerization initiator used is preferably from 0.05 to 5 parts on the basis of 100 parts of the resulting copolymer.

The copolymer I may contain a third comonomer component, provided that the characteristic properties of the alternating copolymer are not widely altered by copolymerization of the third comonomer. Examples of such comonomers are alkyl vinyl ethers and fluoroalkyl vinyl ethers (except 2,2,3,3-tetrafluoropropyl vinyl ether).

Preferably, the fluorine-containing copolymer I is used in combination with a methyl methacrylate polymer containing predominantly methyl methacrylate. The composition comprising the copolymer I and the methyl methacrylate polymer is used for coating, forming or molding. In the specification, the term "forming" is used sometimes as a generic term for coating, forming and molding. Products such as coating film, self-supporting film and molded article obtained from the composition have excellent stain resistance and transparency and a low refractive index, and the processability in producing those products is good.

The methyl methacrylate polymer used in the present invention includes homopolymer of methyl methacrylate and copolymers of methyl methacrylate and another one or more comonomers such as ethyl methacrylate, methyl acrylate, ethyl acrylate, and other methacrylates or acrylates. The content of the other comonomer in the methyl methacrylate polymer is from 0 to 50 parts, preferably from 0 to 30 parts on the basis of 100 parts of methyl methacrylate.

The ratio of the copolymer I to the methyl methacrylate polymer in the composition is from 1/9 to 9/1 by weight, preferably from 3/7 to 7/3 by weight. When the amount of the copolymer I is smaller, the critical surface tension as a measure of the stain resistance of the products from the composition is higher and the transparency is lower. Especially, when the above ratio is lower than 1/9, the effect of the copolymer I is not exhibited. When the amount of the copolymer I is larger, the glass transition temperature of the products from the composition is lower. Especially the above ratio of more than 9/1 is practically undesirable.

The copolymer I, particularly, the alternating copolymer has a specifically excellent compatibility with the above-mentioned methyl methyacrylate polymer, and the molded products obtained from a blend of both are transparent. Copolymers obtained by replacing 2,2,3,3-tetrafluoropropyl vinyl ether being the one component of the copolymer I by other analogous comonomer, e.g. an alternating copolymer of chlorotrifluoroethylene and a vinyl ether having non-substituted alkyl group such as methyl vinyl ether or butyl vinyl ether, have a poor compatibility with the above methyl methacrylate polymer, and the molded products obtained from a blend of both are cloudy. Alternating copolymers of chlorotrifluoroethylene and fluorine-containing vinyl ether other than 2,2,3,3-tetrafluoropropyl vinyl ether, e.g. 2,2,3,3,4,4,5,5-octafluoropentyl vinyl ether and 2,2,3,3,4,4,5,5,6,6,7,7-dodecafluoroheptyl vinyl ether, have also a poor compatibility with the above methyl methacrylate polymer, and the molded products obtained from a blend of both are cloudy. In contrast thereto, the composition of the present invention exhibits special transparency, which is a surprising fact.

The refractive index of the methyl methacrylate polymer mentioned above is about 1.490, while the refractive index of the fluorine-containing alternating copolymer as the copolymer I is about 1.400. The difference in refractive index between both is about 0.090, which is comparable to the difference in refractive index between the core and cladding of optical fiber. The composition of the present invention exhibits an excellent transparency even though the difference in refractive index between both components is large. From this point of view, it is evident that the composition of the present invention is unique.

The composition of the present invention can be prepared by various manners, for instance, by mixing a solution of the copolymer I with a solution of the above methyl methacrylate polymer, or by blending the copolymer I per se and the methyl methacrylate polymer per se by means of hot rolls.

The composition of the present invention can be used for various uses such as stain resistance paints and cladding materials for optical fibers, and the products obtained from the composition, such as coating film, self-supporting film and molded article, are superior in transparency.

The fluorine-containing copolymer II is a copolymer of chlorotrifluoroethylene, 2,2,3,3-tetrafluoropropyl vinyl ether and one or more functional vinyl ethers.

In the present invention, it has been found that any usual polymerization method can be adopted to prepare a fluorine-containing copolymer by selecting the above-mentioned specific fluorine-containing olefin compounds as the component of the copolymer and the obtained fluorine-containing polymer II can be admixed uniformly with methyl methacrylate copolymer either in the presence of a usual solvent or in the absence of solvent. Further, when the fluorine-containing copolymer is employed as a component of paints, the properties of the paints such as chemical resistance, weatherability and stain resistance can be improved. Moreover, a composition comprising the fluorine-containing copolymer II and a specific methyl methacrylate copolymer as mentioned after has room temperature curability and is used as a base resin of paints.

The functional vinyl ether used in the copolymer II is one which has a good copolymerizability with chlorotrifluoroethylene and 2,2,3,3-tetrafluoropropyl vinyl ether and has a functional group capable of imparting a room temperature curability to the resulting copolymer. Such functional vinyl ether includes vinyl ethers having a hydroxyl group, a glycidyl group or an amino group. Typical examples of the functional vinyl ether are vinyl ethers having hydroxyalkyl group of 2 to 10 carbon atoms such as hydroxpropyl vinyl ether, hydroxyisopropyl vinyl ether, 3-hydroxy-1-methylpropyl vinyl ether, hydroxybutyl vinyl ether, hydroxy-2-methylbutyl vinyl ether, hydroxyethyl vinyl ether; glycidyl vinyl ether, glycidylethyleneoxy vinyl ether

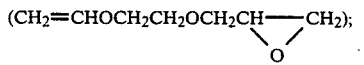

and vinyl ethers having aminoalkyl group of 2 to 10 carbon atoms such as aminoethyl vinyl ether ($CH_2$=$CHOCH_2CH_2NH_2$) and aminopropyl vinyl ether. The preferred functional vinyl ether is hydroxybutyl vinyl ether and glycidyl vinyl ether.

Preferably the fluorine-containing copolymer II contains 40 to 60% by mole of chlorotrifluoroethylene, 25 to 50% by mole of 2,2,3,3-tetrafluoropropyl vinyl ether and 0.5 to 25% by mole of the functional vinyl ether. When the content of chlorotrifluoroethylene is more than 60% by mole, the solubility of the resulting copolymer is lowered. When the content of chlorotrifluoroethylene is less than 40% by mole, the properties of the resulting copolymer such as chemical resistance, weatherability and stain resistance are poor. When the content of 2,2,3,3-tetrafluoropropyl vinyl ether is more than 50% by mole, the properties of the resulting copolymer such as chemical resistance, weatherability and stain resistance are poor. When the content of vinyl ether is less than 25% by mole, it is difficult to mix uniformly the resulting polymer with the methyl methacrylate copolymers. The content of the functional vinyl ether may be appropriately decided in consideration of the properties of the resulting copolymer, such as hardness and chemical resistance, required depending upon the uses thereof. However, when the content of the functional vinyl ether is more than 25% by mole, there occur problems as to the solubility of the resulting copolymer due to the influence of the functional group and the physical properties of the coating film obtained from the resulting copolymer become poor. When the content of the functional vinyl ether is less than 0.5% by mole, room temperature curability cannot be obtained.

The fluorine-containing copolymer II may contain as a fifth comonomer one or more other monomers, provided that the characteristic properties of the copolymer II are not widely altered. Examples of such comonomers are alkyl vinyl ethers having an alkyl group of 1 to 10 carbon atoms such as methyl vinyl ether, ethyl vinyl ether, n-propyl vinyl ether, isopropyl vinyl ether, n-butyl vinyl ether, isobutyl vinyl ether and 2-chloroethyl vinyl ether; and fluoroalkyl vinyl ethers corresponding to those wherein a part or all of the hydrogen atoms of the alkyl group of the above-mentioned alkyl vinyl ether are replaced by fluorine atoms (except in 2,2,3,3-tetrafluoropropyl vinyl ether), such as 2,2,3,3,4,4,5,5-octafluoropentyl vinyl ether and 2,2,3,3,4,4,5,5,6,6,7,7,8,8,9,9-hexadecafluorononyl vinyl ether.

The fluorine-containing copolymer is prepared by subjecting chlorotrifluoroethylene, 2,2,3,3-tetrafluoropropyl vinyl ether and the functional vinyl ether to usual polymerization reaction such as emulsion polymerization in an aqueous medium, suspension polymerization in an aqueous medium and solution polymerization in a solvent, in the presence of a polymerization initiator at a temperature of $-20°$ to $150°$ C., preferably from 5° to 95° C. under a pressure of not more than 100 kg/cm$^2$G, preferably 0 to 30 kg/cm$^2$G, more preferably 0 to 10 kg/cm$^2$G.

Examples of the solvent used in the solution polymerization are halogenated hydrocarbons such as trichlorotrifluoroethane and 1,1,1,2-tetrachloro-2,2-difluoroethane; ketones such as methyl ethyl ketone and methyl isopropyl ketone; and acetic acid esters such as ethyl acetate and butyl acetate.

Examples of the polymerization initiator used are persulfates such as ammonium persulfate and potassium persulfate; redox type polymerisation initiators such as combinations of the foregoing persulfates and sulfites (such as potassium sulfite and sodium sulfite) and/or hydrogensulfites (such as potassium hydrogensulfite and sodium hydrogensulfite); peroxide type polymerization initiators such as diisopropyl peroxydicarbonate, tert-butyl peroxybutyrate and benzoyl peroxide; and azo type polymerization initiators such as azobisisobutyronitrile. The amount of the polymerization initiator used is usually from 0.01 to 5% by weight, preferably from 0.05 to 1.0% by weight on the basis of the total amount of the monomers used.

The fluorine-containing copolymer II is soluble in usual solvents such a methyl ethyl ketone, trichlorotrifluoroethane, ethyl acetate and butyl acetate. The copolymer II can be mixed uniformly with methyl methacrylate polymers by various manners such as mixing their solutions and blending their bulks in the absence of solvent by hot rolls. Moreover, the copolymer II is used in combination with the specific functional methyl methacrylate copolymer mentioned below to give a curable resin composition.

The functional methyl methacrylate copolymer used in the curable composition is a copolymer of methyl methacrylate and one or more monomers having a functional group such as hydroxyethyl methacrylate, glycidyl methacrylate, acrylamide and methacrylamide. The functional methyl methacrylate copolymer optionally contains as a third comonomer unit one or more monomers such as ethyl methacrylate, butyl methacrylate, trifluoroethyl methacrylate, pentafluoropropyl methacrylate, methyl acrylate and butyl acrylate. The uniformity of the curable resin composition and of the coating film obtained therefrom varies delicately depending upon the kind of functional group in the functional methyl methacrylate copolymer. The third monomer is used to control such delicate influence.

The functional methyl methacrylate copolymer contains 60 to 99.5% by mole of the methyl methacrylate unit, 0.5 to 25% by mole of the functional monomer unit and 0 to 30% by mole of the third monomer unit. When the content of the methyl methacrylate unit is less than 60% by mole, the resulting copolymer is poor in compatibility with the fluorine-containing copolymer II and it is difficult to obtain a uniform composition. When the content of the functional monomer unit is more than 25% by mole, the resulting copolymer is poor in compatibility with the fluorine-containing copolymer II and it is difficult to obtain a uniform composition. When the content of the functional monomer unit is less than 0.5% by mole, the curability of the resulting copolymer is poor.

In the curable composition, it is preferable that the ratio of the fluorine-containing copolymer II to the functional methyl methacrylate copolymer is from 1/9 to 9/1 by weight, particularly from 3/7 to 7/3 by weight. When the amount of the functional methyl methacrylate copolymer is more than 9/10, the characteristic properties of the copolymer II such as chemical resistance, weatherability and stain resistance are not almost exhibited. When the amount of the functional methyl methacrylate copolymer is less than 1/10, the characteristic properties of the functional methyl methacrylate copolymer such as high glass transition temperature are not sufficiently exhibited.

The above curable resin composition of the present invention is cured by adding a curing agent thereto. Examples of the curing agent used in the case where the functional is hydroxyl group are polyfunctional isocyanates such as hexamethylene diisocyanate and its trimer and derivatives, xylylene diisocyanate, tolylene diisocyanate, hydrogenated tolylene diisocyanate and hydrogenated 4,4-diphenylmethane diisocyanate. Such curing agents are used properly depending upon the uses of the curable resin composition. Examples of the curing agent used in the case where the functional group is glycidyl are amines such as diethylenetriamine, triethylenetetramine, xylenediamine, metaphenylenediamine, benzyldimethylamine and bisaminopropyltetraoxa-spiroundecane. Such curing agents are chosen depending upon the uses of the curable resin composition. Examples of the curing agent used in the case where the functional group is amino group are straight chain type diepoxides having the following formula:

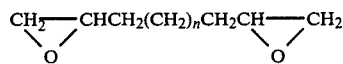

wherein n is zero or an integer of 1 to 4, an aromatic diepoxide and an aromatic triepoxide having the following formula:

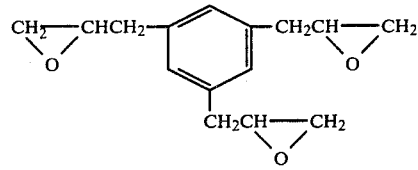

The above curable resin composition of the present invention can be used as paints, etc., as it is or in a state wherein it is dissolved or dispersed into a solvent.

The paints prepared by using the curable resin composition can be used as outdoor or indoor paints and are used for coating various materials such as metals, woods, concretes and plastics. The formed coating films have excellent chemical resistance, weatherability and stain resistance. Especially, when the coating film obtained from the curable resin composition has a light transmittance of not less than 70% for the region of the wavelength of visible light at a film thickness of 0.2 mm, the saturation of pigments used for preparation of paints and the gloss of the coating film are good.

Furthermore, the present invention provides a curable fluorine-containing resin composition for a paint which has a good storage stability. That is, the present invention provides a composition suitable as a base for a paint comprising a solution of a fluorine-containing copolymer corresponding to that wherein the functional vinyl ether of the above-mentioned fluorine-containing copolymer II is a hydroxyalkyl vinyl ether (hereinafter this fluorine-containing copolymer is referred to as "copolymer IIa"); and a tertiary amine.

As previously described, paints using fluorine-containing a copolymer having hydroxyalkyl groups as a base have a poor storage stability and gelation occurs during storage.

According to the present inventors' researches, it is estimated that the gelation is caused by a mechanism whereby the fluoroolefin monomer remaining in the resulting polymerization reaction solution is decomposed by oxidation to form acids, which attack the hydroxyl group of the fluorine-containing copolymer to cause crosslinking. The tendency to gelation varies depending upon the molecular weight of the copolymer and the concentration of the copolymer in the reaction solution. The gelation reaction proceeds rapidly with increasing molecular weight of the copolymer and with increasing concentration of the copolymer. Especially, the gelation tends to occur when the pH of the solution becomes below 3. From these facts, it has been found that, when the reaction solution is used as a base for paints, it is desirable to maintain the reaction solution at a pH value of not less than 4.

On the basis of the above findings, the present inventors have tried to prevent the gelation by adding a variety of basic substances to the polymerization reaction solution.

At first, basic inorganic compounds such as sodium tetraborate and sodium carbonate are added to the reaction solution to remove any acid therein. In that case, the reaction solution is kept neutral temporarily but acids are gradually formed to cause gelation. Thus, long-term storage stability is not achieved. The reason therefor is estimated that the basic inorganic compound is hardly soluble in the reaction solution.

Next, basic organic metal compounds such as metal alcoholate and metal phenolate are added to the reaction solution. However, the basic organic metal compound causes the decomposition or coloration of the copolymer due to its strongly basicity and the resulting solution is hardly used as a base for paints.

Moreover, amido compounds or amine compounds which are easily soluble in the reaction solution are added to the reaction solution. However, the gelation is not prevented with amido compounds. Primary amines or secondary amines cause coloration and do not prevent the gelation sufficiently. Unexpectedly, it has been found that only tertiary amines have a good activity in preventing the gelation and almost do not cause coloration.

It is a surprising fact that only tertiary amines can prevent the gelation. The reason therefor is that generally amine compounds are used for crosslinking fluorine-containing copolymer on the basis of the elimination of hydrogen chloride or hydrogen fluoride and it is known that coloration is caused as a result of the gelation. In fact, the fluorine-containing copolymer having hydroxyalkyl groups as a functional group used in the present invention is subject to gelation by adding primary amines or secondary amines so that the copolymer is colored.

The preferred tertiary amine used in the present invention is a strongly basic tertiary amine having a pKa value of 8.0 to 11.5, preferably from 9 to 11. A tertiary amine having a pKa value of less than 8.0 is poor in preventing gelation. A tertiary amine having a pKa value of more than 11.5 tends to cause dehydrohalogenation of the copolymer which results in remarkable coloration. Examples of the preferred tertiary amine ae triethylamine, tri-n-propylamine, N-methylpyrrolidine, N-methylpiperidine, diethylpropylamine and N,N-dimethylbenzylamine, and mixtures of two or more foregoing amines. However, the tertiary amine used in the present invention is not limited to the foregoing amines.

The fluorine-containing copolymer IIa used in combination with the tertiary amine is used in the form of a solution prepared by solution polymerization. The solution polymerization may be conducted in the same manner as the solution polymerization used in preparing the copolymer II.

The tertiary amine is added to the polymerization reaction solution containing the copolymer IIa. The preferred amount of the tertiary amine used is from 1 microequivalent per 1 g of the copolymer IIa (hereinafter referred to as "$\mu$eq/g") to 1 milliequivalent per 1 g of the copolymer IIa (hereinafter referred to as "meq/g"). When the amount of the tertiary amine used is less than 1 $\mu$eq/g, the prevention of the gelation tends to be insufficient. When the amount of the tertiary amine used is more than 1 meq/g, the copolymer IIa tends to be colored and the economy is poor. The most preferred amount of the tertiary amine is from 10 $\mu$eq/g to 500 $\mu$eq/g.

To the composition prepared by adding the tertiary amine to the polymerization reaction solution as in the above manner, there is added appropriately one or more solvents such as the acetic acid esters or ketones used in the polymerization to adjust the concentration of the copolymer IIa. The concentration of the copolymer in the composition is preferably from 10 to 60% by weight, more preferably from 30 to 50% by weight.

The above composition of the present invention is used as a base for paints curable at room temperature. Namely, the composition is mixed with various additives such as pigment, viscosity modifier, levelling agent, curing agent, film forming auxiliary and wetting agent to give a paint.

In order to cure the above composition of the present invention at ordinary temperature, curing agents such as polyfunctional isocyanates are used. In case of using polyfunctional isocyanates, it is preferable that the tertiary amine used has a boiling point of 50° to 200° C. When a tertiary amine having a boiling point of less than 50° C. is used, foaming sometimes occurs in the resulting coating film depending upon the curing condition, and whitening of the coating film tends to occur due to moisture absorption because of its latent heat of vaporization. When a tertiary amine having a boiling point of more than 200° C. is used, the amine tends to remain in the coating film for a long period of time so that the physical properties of the coating film are lowered due to its moisture absorption.

The present invention is more particularly described and explained by means of the following Examples. These Examples are intended to illustrate the invention and should not be construed to limit the scope of the invention. It is to be understood that various changes and modifications may be made in the invention without departing from the spirit and scope thereof.

EXAMPLE 1

Into a 1000 ml glass autoclave were added 350 ml of an ion exchanged water and 1 g of sodium carbonate. After the space in the autoclave is sufficiently displaced by nitrogen gas to remove oxygen, 180 ml of trichlorotrifluoroethane was added into the autoclave, followed by the addition of 34.5 g of 2,2,3,3-tetrafluoropropyl vinyl ether and 25.4 g of chlorotrifluoroethylene. After the mixture was heated with agitating up to 65° C., 0.3 g of azobisisobutyronitrile was added and the polymerization was carried out at 65° C. for 8 hours. The pressure at the beginning of polymerization was 2.1 kg/cm$^2$G and the pressure after 8 hours from the beginning of polymerization is 0.2 kg/cm$^2$G.

The obtained reaction mixture containing the resulting polymer which was dissolved in the trichlorotrifluoroethane was added with agitating into petroleum ether to precipitate the polymer. The precipitate was dried under a reduced pressure to give 48 g of a colorless transparent polymer.

The obtained polymer was analyzed by elemental analysis and by $^{19}$F NMR analysis. It was found that the polymer is an alternating copolymer wherein the molar ratio of chlorotrifluoroethylene to 2,2,3,3-tetrafluoropropyl vinyl ether is b 1/1 from the result of the elemental analysis and there are substantially no direct bonding between the vinyl ether units with each other and no direct bonding between the chlorotrifluoroethylene units with each other from the result of the $^{19}$F NMR analysis.

The alternating copolymer had a thermal decomposition temperature (the temperature where the reduction of weight begins, determined at heating rate of 10° C./min in air) of 263° C., a glass transition temperature (determined by DSC at heating rate of 10° C./min) of 33° C., a refractive index ($n_D^{20}$) of 1.400, a critical surface tension of 25 dyn/cm and a light transmittance (the transmittance of wavelength ranging from 400 to 800 nm through a sheet having a thickness of 1 mm) of 93.5%. The alternating copolymer was soluble in methyl ethyl ketone or trichlorotrifluoroethane.

Elemental analysis: Found (%): C 30.6, Cl 12.8, F 48.5.

The critical surface tension was determined as follows: The alternating copolymer was dissolved into methyl ethyl ketone and the resulting solution was applied onto an aluminum plate to form a coating film. The coating film was dried sufficiently in vacuo for 4 days to remove the solvent contained therein. As to the dried coating film, a contact angle of water, glycerol, diethylene glycol, methylene diiodide or tetrachloroethylene was measured at 20° C. with an apparatus for determining contact angle made by Kyowa Kagakusha Kabushiki Kaisha. The critical surface tension was determined from the measurements of the contact angle by means of a Zisman plot.

The light transmittance was determined as follows. The alternating copolymer was blended by means of hot rolls and formed into a film having a thickness of 1 mm at 200° C. by means of a hot press. As to the film, the light transmittance was determined with a self-registering spectrophotometer made by Hitachi, Ltd.

REFERENCE EXAMPLE 1

Into a 300 ml four-necked flask were added 47 g of methyl methacrylate, 13 g of ethyl methacrylate, 60 g of methyl ethyl ketone as a solvent, 1.2 g of stearyl mercaptan as a chain transfer agent and 0.6 g of azobisisobutyronitrile as a polymerization initiator. After the flask was evacuated, the mixture was heated with agitating up to 70° C. and the polymerization was carried out at 70° C. for 7 hours to give a viscous polymer solution having a solid content of 48% by weight.

The resulting copolymer had an intrinsic viscosity [η] of 0.16 (dl/g) (determined in methyl ethyl ketone at 35° C.), a glass transition temperature of 70° C. and a critical surface tension of 43 dyn/cm. The glass transition temperature and the critical surface tension were determined in the same manner as in Example 1.

EXAMPLES 2 TO 6

The alternating copolymer obtained in Example 1 was dissolved into methyl ethyl ketone to give a 20% by weight solution. The solution of the methyl methacrylate copolymer obtained in Reference Example 1 was diluted with methyl ethyl ketone to give a 20% by weight solution.

The obtained two solutions were mixed with each other at the ratios shown in Table 1 and the compatibility of both polymers with each other was observed with the naked eye. Employing the mixture, a coating film was prepared in the same manner as in Example 1 and the transparency of the obtained coating film was observed with the naked eye. Further, as to the coating film, the glass transition temperature and the critical surface tension were determined in the same manner as in Example 1.

The results thereof are shown in Table 1. In Table 1, the symbols in the column "transparency" have the following meanings:

O—Good in transparency

X—Bad in transparency (cloudy or separation into two layers)

COMPARATIVE EXAMPLES 1 TO 7

[Preparation of fluorine-containing copolymer]

The same procedures as in Example 1, except that the vinyl ethers shown in Table 1 were used instead of 2,2,3,3-tetrafluoropropyl vinyl ether in an amount equimolar with the latter, were repeated to give alternating copolymers.

[Polymer blend composition]

A 20% weight solution of the methyl methacrylate copolymer obtained in Reference Example 1 and a 20% by weight solution of each fluorine-containing alternating copolymer, obtained above, in methyl ethyl ketone were mixed at the ratios shown in Table 1. The transparency of the blend and the transparency of a coating film obtained from the blend were observed in the same manner as in Examples 2 to 6.

The results are shown in Table 1.

TABLE 1

| | Vinyl ether in fluorine-containing alternating copolymer | Alternating copolymer/ methyl methacrylate copolymer (by weight) | Transparency of mixed polymer solution | Physical property of coating film | | |
|---|---|---|---|---|---|---|
| | | | | Transparency | Glass transition temperature (°C.) | Critical surface tension (dyn/cm) |
| Ex. 2 | 2,2,3,3-tetrafluoropropyl vinyl ether | 4/1 | | | 40 | 31 |
| Ex. 3 | 2,2,3,3-tetrafluoropropyl vinyl ether | 2/1 | | | 43 | 36 |
| Ex. 4 | 2,2,3,3-tetrafluoropropyl vinyl ether | 1/1 | | | 45 | 39 |
| Ex. 5 | 2,2,3,3-tetrafluoropropyl vinyl ether | 1/2 | | | 47 | 41 |
| Ex. 6 | 2,2,3,3-tetrafluoropropyl vinyl ether | 1/4 | | | 56 | 42 |
| Com. Ex. 1 | Methyl vinyl ether | 1/1 | X | X | — | — |
| Com. Ex. 2 | Ethyl vinyl ether | 1/1 | X | X | — | — |
| Com. Ex. 3 | Propyl vinyl ether | 1/1 | X | X | — | — |
| Com. Ex. 4 | Butyl vinyl ether | 1/1 | X | X | — | — |
| Com. Ex. 5 | Isobutyl vinyl ether | 1/1 | X | X | — | — |
| Com. | 2,2,3,3,4,4,5,5- | 1/1 | X | X | — | — |

TABLE 1-continued

| | Vinyl ether in fluorine-containing alternating copolymer | Alternating copolymer/methyl methacrylate copolymer (by weight) | Transparency of mixed polymer solution | Physical property of coating film | | |
|---|---|---|---|---|---|---|
| | | | | Transparency | Glass transition temperature (°C.) | Critical surface tension (dyn/cm) |
| Ex. 6 | Octafluoropentyl vinyl ether | | | | | |
| Com. Ex. 7 | 2,2,3,3,4,4,5,5,6,6,7,7-Dodecafluoroheptyl vinyl ether | 1/1 | X | X | — | — |

EXAMPLES 7 TO 11

The alternating copolymer obtained in Example 1 was mixed with a commercially available methyl methacrylate copolymer (Acripet MF made by Mitsubishi Rayon Co., Ltd.) at the ratios shown in Table 2 and the mixture was sufficiently blended by means of hot rolls of 160° C. and formed into a film in the same manner as in Example 1. For the resulting film, the light transmittance was determined. The result thereof is shown in Table 2.

TABLE 2

| | Ratio of alternating copolymer/Acripet MF (by weight) | Light transmittance (%) | | | | |
|---|---|---|---|---|---|---|
| | | 400 nm | 500 nm | 600 nm | 700 nm | 800 nm |
| Ex. 7 | 1/0 | 91.1 | 92.2 | 93.5 | 93.5 | 93.5 |
| Ex. 8 | 3/1 | 85.5 | 91.3 | 92.9 | 93.2 | 93.2 |
| Ex. 9 | 1/1 | 87.3 | 91.8 | 92.9 | 93.2 | 92.9 |
| Ex. 10 | 1/3 | 83.2 | 86.7 | 87.7 | 89.8 | 90.0 |
| Ex. 11 | 0/1 | 92.2 | 93.3 | 93.8 | 93.9 | 93.9 |

EXAMPLE 12

Into a 1000 ml glass autoclave were added 350 ml of an ion exchanged water and 1 g of sodium carbonate. After the space in the autoclave is sufficiently displaced by nitrogen gas to remove oxygen, 180 ml of trichlorotrifluoroethane was added into the autoclave, followed by the addition of 28.5 g of 2,2,3,3-tetrafluoropropyl vinyl ether, 5.2 g of hydroxybutyl vinyl ether and 28 g of chlorotrifluoroethylene. After the mixture was heated with agitating up to 45° C., 0.35 g of diisopropyl peroxydicarbonate as a polymerization initiator was added and the polymerization was carried out at 45° C. for 8 hours. The pressure at the beginning of polymerization was 2.0 kg/cm$^2$G and the pressure after 8 hours from the beginning of polymerization is 0.2 kg/cm$^2$G.

The obtained reaction mixture containing the resulting polymer which was dissolved in the trichlorotrifluoroethane was added with agitating into petroleum ether to precipitate the polymer. The precipitate was dried under a reduced pressure to give 51 g of a polymer (conversion: 83%).

The obtained polymer had an intrinsic viscosity [η] of 0.23 (dl/g) at 35° C., a thermal decomposition temperature of 277° C. and a glass transition temperature of 43° C. Those measurements were determined in the same manner as in Example 1.

The polymer was subjected to elemental analysis, determination of hydroxyl value and infrared spectrum (IR) analysis. It was found that the polymer was a copolymer which contained hydroxyl groups from the result of the IR analysis and had a ratio of chlorotrifluoroethylene/2,2,3,3-tetrafluoropropyl vinyl ether/hydroxybutyl vinyl ether of 5/4/1 by mole from the results of the determination of hydroxyl value (provided in JIS K 0070-1966) and the elemental analysis.

Elemental analysis: Found (%): C 31.7 Cλ 15.3 F 43.8

EXAMPLES 13 TO 16

The same procedures as in Example 12, except that while the amount of chlorotrifluoroethylene used was the same as in Example 12, the other monomers shown in Table 3 were used at the ratios shown in Table 3 on the basis of the amount of chlorotrifluoroethylene used, were repeated to give copolymers having the composition as shown in Table 3.

For the obtained copolymers, the intrinsic viscosity, the thermal decomposition temperature and the glass transition temperature were determined in the same manner as in Example 12.

The results thereof are shown in Table 3.

REFERENCE EXAMPLE 2

Into a 300 ml four-necked flask were added 46.8 g of methyl methacrylate, 6 g of pentafluoropropyl methacrylate, 7.2 g of hydroxyethyl methacrylate, 60 g of methyl ethyl ketone as a solvent, 1.0 g of stearyl mercaptan as a chain transfer agent and 0.5 g of azobisisobutyronitrile as a polymerization initiator. After the flask was evacuated, the mixture was heated with agitating up to 70° C. and the polymerization was carried out at 70° C. for 7 hours to give a viscous polymer solution (conversion: 98%).

As to the obtained polymer, the intrinsic viscosity, the glass transition temperature and the thermal decomposition temperature were determined in the same manner as in Example 12. The results are shown in Table 3.

The polymer was subjected to IR analysis, elemental analysis and determination of hydroxyl value. It was found that the polymer is a copolymer which had hydroxyl groups from the result of the IR analysis and had a ratio of methyl methacrylate/pentafluoropropyl methacrylate/hydroxyethyl methacrylate of about 85/5/10 by mole from the results of the determination of hydroxyl value and the elemental analysis.

REFERENCE EXAMPLE 3

The same procedures as in Reference Example 2, except that 69 g of methyl methacrylate, 11 g of glycidyl methacrylate, 80 g of methyl ethyl ketone, 0.6 g of stearyl mercaptan and 0.6 g of azobisisobutyronitrile were used, were repeated to give a polymer (conversion: 97.5%).

For the obtained polymer, the intrinsic viscosity, the glass transition temperature and the thermal decomposition temperature were determined in the same manner as in Example 12. The results are shown in Table 3.

The polymer was subjected to elemental analysis and determination of hydroxyl value, which revealed that the polymer had a ratio of methyl methacrylate/glycidyl methacrylate of about 90/10 by mole.

REFERENCE EXAMPLE 4

The same procedures as in Reference Example 2, except that ethyl methacrylate was used in an amount equimolar with pentafluoropropyl methacrylate, were repeated to give a polymer.

For the obtained polymer, the intrinsic viscosity, the glass transition temperature and the thermal decomposition temperature were determined in the same manner as in Reference Example 12. The results thereof are shown in Table 3.

The polymer was subjected to elemental analysis and determination of hydroxyl value, which revealed that the polymer had a ratio of methyl methacrylate/ethyl methacrylate/hydroxyethyl methacrylate of about 80/10/10 by mole.

TABLE 3

| | Composition of copolymer | Ratio of monomer units (by mole) | Intrinsic viscosity (dl/g) | Glass transition temperature (°C.) | Thermal decomposition temperature (°C.) |
| --- | --- | --- | --- | --- | --- |
| Ex. 12 | CTFE/4FVE/HBVE | (5/4/1) | 0.23 | 43 | 277 |
| Ex. 13 | CTFE/4FVE/GVE | (5/4/1) | 0.21 | 40 | 270 |
| Ex. 14 | CTFE/4FVE/HBVE | (10/9/1) | 0.21 | 39 | 269 |
| Ex. 15 | CTFE/4FVE/HBVE | (5/3/2) | 0.23 | 45 | 272 |
| Ex. 16 | CTFE/4FVE/GVE | (10/9/1) | 0.22 | 37 | 270 |
| Ref. Ex. 2 | MMA/5FM/HEMA | (17/1/2) | 0.115 | 97 | 264 |
| Ref. Ex. 3 | MMA/GMA | (9/1) | 0.14 | 96 | 269 |
| Ref. Ex. 4 | MMA/EMA/HEMA | (8/1/1) | 0.13 | 84 | 265 |

The monomer units of the copolymers shown in Table 3 are as follows:
CTFE: Chlorotrifluoroethylene
4FVE: 2,2,3,3-tetrafluoropropyl vinyl ether
HBVE: Hydroxybutyl vinyl ether
GVE: Glycidyl vinyl ether
MMA: Methyl methacrylate
5FM: pentafluoropropyl methacrylate
HEMA: Hydroxyethyl methacrylate
GMA: Glycidyl methacrylate
EMA: Ethyl methacrylate

EXAMPLES 17 TO 26

The copolymers obtained in Example 12, Reference Example 2 and Reference Example 4 were dissolved in methyl ethyl ketone to give 20% by weight solutions, respectively. The solution of the copolymer of Example 12 was mixed with the solution of the copolymer of Reference Example 2 or the solution of the copolymer of Reference Example 4 at the ratios as shown in Table 4. It was confirmed with the naked eye that, in every instances, the two solutions were uniformly mixed.

To 100 parts of each of the mixtures obtained above was added 3 parts of a 50% by weight solution of the trimer of hexamethylene diisocyanate in methyl ethyl ketone, and the resultant mixture was fully mixed. Each of the obtained mixtures was applied on a film made of a copolymer of tetrafluoroethylene and hexafluoropropylene which was previously subjected to etching treatment by sputtering and cured at a room temperature for 3 days. The resulting coated film was dried in a vacuum drier to remove the solvent completely to give a coating film having a thickness of 0.2 mm.

For the obtained coating films, the glass transition temperature and the light transmittance at 650 nm were determined in the same manner as in Example 1. The results thereof are shown in Table 4. As to the sample of Example 19, the light transmittance was observed at various wavelengths. The results thereof are shown in Table 5.

Each of the above compositions containing the curing agent was applied on a sufficiently degreased aluminum plate of 0.2 mm in thickness and the coated plate was dried at room temperature for 3 days and then in a vacuum drier for 4 days to remove the solvent completely. As to the obtained coating films, the critical surface tension was determined in the same manner as in Example 1. The results thereof are shown in Table 4.

EXAMPLES 27 TO 29

The copolymers obtained in Example 13 and Reference Example 3 were dissolved in methyl ethyl ketone to give a 20% by weight solution, respectively. The obtained two solutions were mixed at the ratios as shown in Table 4. It was confirmed with the naked eye that, in every instance, the two solutions were uniformly mixed.

To 100 parts of each of the mixtures obtained above were added 12 parts of a 50% by weight solution of bisaminopropyl tetraoxaspiroundecane (curing agent) in methyl ethyl ketone, and the resultant mixture was fully mixed. Employing each of the obtained mixtures, two kinds of samples were prepared in the same manner as in Examples 17 to 26, and the glass transition temperature, the light transmittance and the critical surface tension were determined with those samples in the same manner as in Examples 17 to 26. The results thereof are shown in Table 4.

TABLE 4

| | Copolymers | | Ratio of Copolymer (a)/ Copolymer (b) (by weight) | Glass transition temperature (°C.) | Light transmittance (%) | Critical surface tension (dyn/cm) |
| --- | --- | --- | --- | --- | --- | --- |
| | Copolymer (a) | Copolymer (b) | | | | |
| Ex. 17 | CTFE/4FVE/HBVE | MMA/5FM/HEMA | 4/1 | 47 | 92.7 | 30 |
| Ex. 18 | " | " | 2/1 | 52 | 93.0 | 34 |
| Ex. 19 | " | " | 1/1 | 55 | 93.1 | 37 |
| Ex. 20 | " | " | 1/2 | 63 | 91.5 | 39 |

TABLE 4-continued

|  | Copolymers | | Ratio of Copolymer (a)/ Copolymer (b) (by weight) | Glass transition temperature (°C.) | Light transmittance (%) | Critical surface tension (dyn/cm) |
| --- | --- | --- | --- | --- | --- | --- |
|  | Copolymer (a) | Copolymer (b) |  |  |  |  |
| Ex. 21 | " | " | 1/4 | 72 | 88.5 | 41 |
| Ex. 22 | " | MMA/EMA/HEMA | 4/1 | 44 | 93.0 | 32 |
| Ex. 23 | " | " | 2/1 | 45 | 92.7 | 35 |
| Ex. 24 | " | " | 1/1 | 45 | 93.3 | 39 |
| Ex. 25 | " | " | 1/2 | 50 | 91.7 | 41 |
| Ex. 26 | " | " | 1/4 | 51 and 73 | 85.5 | 42 |
| Ex. 27 | CTFE/4FVE/GVE | MMA/GMA | 2/1 | 45 | 93.0 | 34 |
| Ex. 28 | " | " | 1/1 | 51 | 93.0 | 38 |
| Ex. 29 | " | " | 1/2 | 60 | 90.5 | 40 |

TABLE 5

| Wave length (nm) | Light transmittance (%) |
| --- | --- |
| 800 | 93.1 |
| 700 | 93.2 |
| 600 | 93.2 |
| 500 | 92.8 |
| 400 | 91.5 |

TABLE 6

|  |  | Methyl methacrylate polymer | | | |
| --- | --- | --- | --- | --- | --- |
|  | Kind of vinyl ether | PMMA | MMA/5FM/HEMA = 85/5/10 | MMA/EMA/HEMA = 80/10/10 | MMA/HEMA = 90/10 |
| Ex. 30 | 4FVE | Δ |  |  | Δ |
| Com. Ex. 8 | Ethyl vinyl ether | X | X | X | X |
| Com. Ex. 9 | Methyl vinyl ether | X | X | X | X |
| Com. Ex. 10 | Propyl vinyl ether | X | X | X | X |
| Com. Ex. 11 | Butyl vinyl ether | X | X | X | X |
| Com. Ex. 12 | 8FVE | X | X | X | X |
| Com. Ex. 13 | 16FVE | X | X | X | X |

8FVE: $CH_2=CHOCH_2(CF_2CF_2)_2H$
16FVE: $CH_2=CHOCH_2(CF_2CF_2)_4H$
PMMA: Polymethyl methacrylate

EXAMPLE 30

The copolymer obtained in Example 12 was dissolved in methyl ethyl ketone to give a 20% by weight solution. The methyl methacrylate polymers as shown in Table 6 were dissolved in methyl ethyl ketone to give 20% by weight solutions, respectively.

The solution of the copolymer of Example 12 and each solution of the methyl methacrylate polymer were added in a 20 ml sample tube at a ratio of the former to the latter of 1/1 by weight and the sample tube was fitted with a cap. After the sample tube was shaken, the compatibility of two solutions was observed. The results thereof are shown in Table 6. The compatibility was judged according to the following standards:

O—The mixed solution was uniform.

Δ—The mixed solution was a little non-uniform.

X—The mixed solution was cloudy or separated into two layers.

COMPARATIVE EXAMPLES 8 TO 13

The same procedures as in Example 12, except that each of the vinyl ethers as shown in Table 6 was employed instead of 2,2,3,3-tetrafluoropropyl vinyl ether (4FVE) in an amount equimolar with 4FVE, were repeated to give each copolymer.

The same procedures as in Example 30, except that a 20% by weight solution of each of the above-obtained copolymer in methyl ethyl ketone was employed instead of the solution of the copolymer of Example 12, were repeated. The results thereof are shown in Table 6.

EXAMPLE 31

Into a 1000 ml glass autoclave equipped with an agitator, and the inner space of which was replaced with nitrogen gas and maintained under a reduced pressure, were added 160 ml of butyl acetate, 160 ml of ethyl acetate, 130 g of 2,2,3,3-tetrafluoropropyl vinyl ether (4FVE), 25 g of 4-hydroxybutyl vinyl ether (HBVE) and 1.6 g of azobisisobutyronitrile. Then 117 g of chlorotrifluoroethylene (CTFE) was added thereto. The reagents used were sufficiently deoxidated previously. The mixture was heated up to 70° C. When the temperature of the mixture reached to 70° C., the inner pressure of the autoclave was 4.7 kg/cm²G. The polymerization reaction was carried out with agitating at 70° C. for 4.5 hours. When the inner pressure was lowered to 1.0 kg/cm²G, the autoclave was cooled to room temperature with water and the inner space of the autoclave was replaced with nitrogen gas to remove the unchanged monomers. In the above copolymerization reaction, the average polymerization rate was 160 g/liter.hr and the conversion was 86% by weight. The obtained copolymer had a ratio of CTFE/4-FVE/HBVE of 50/39/11 by mole. The obtained polymerization reaction solution contained 47% by weight of the copolymer.

Butyl acetate was added to the polymerization reaction solution to adjust the concentration of the copolymer to 40% by weight. To 100 g of the resulting solution was added 120 mg of triethylamine and the mixture was sufficiently agitated. The amount of triethylamine used was 30 μeq/g.

Into a 50 ml sample tube was added 30 ml of the composition for a paint obtained above, and the sample tube was sealed. The sample tube was placed in a thermostat kept at 40° C. and the storage stability (gelation) and coloration of the composition were observed. The composition did not set to gel and was tinged slightly with light yellow even after the lapse of 6 months.

EXAMPLES 32 TO 34

The copolymers shown in Table 7 were prepared in the same manner as in Example 31. The copolymer concentration of each of the obtained polymerization reaction solutions was adjusted to that shown in Table 7 and triethylamine was added to the resulting solution in an amount of 30 μeq/g to give a composition for a paint.

For the obtained compositions, the storage stability and the coloration were observed in the same manner as in Example 31. All compositions did not set to gel and were tinged slightly with light yellow even after the lapse of 6 months.

TABLE 7

|  | Copolymer (% by mole) | Copolymer concentration of composition (% by weight) |
| --- | --- | --- |
| Ex. 32 | CTFE/4FVE/HBVE (50/39/11) | 47 |
| Ex. 33 | CTFE/4FVE/n-BVE/HBVE (51/18/21/10) | 46 |
| Ex. 34 | CTFE/4FVE/HBVE (50/44/6) | 45 | n-BVE: n-Butyl vinyl ether

EXAMPLES 35 TO 40

To the same polymerization reaction solution as obtained in Example 31, except that the copolymer concentration was adjusted to 40% by weight, was added a tertiary amine shown in Table 8 in an amount shown in Table 8 to prepare a composition for a paint.

For the obtained compositions, the storage stability and the coloration were observed in the same manner as in Example 31. Further, employing each of the compositions, a coating film was formed and the state and coloration of the film were observed. The results are shown in Table 8.

The coating film was formed as follows. To the composition was added the trimer of hexamethylene diisocyanate in such an amount that the amount of the isocyanate group contained in the trimer was equivalent to that of the hydroxyl group contained in the copolymer. The resultant mixture was fully mixed and applied onto an aluminum plate and the resulting coating film was allowed to stand at room temperature for 3 to 5 days.

COMPARATIVE EXAMPLE 14

For comparison, the storage stability and coloration of the polymerization reaction solution employed in Example 35 were observed.

To the polymerization reaction solution was added the trimer of hexamethylene diisocyanate in the same manner as in Example 35. Employing the obtained composition, a coating film was formed and the state and coloration of the film were observed in the same manner as in Example 35.

The results thereof are shown in Table 8.

COMPARATIVE EXAMPLES 15 TO 18

The same procedures as in Example 35 except that the basic substances shown in Table 8 were employed were repeated. The results are shown in Table 8.

TABLE 8

|  | Basic substance | | | | Composition | | |
| --- | --- | --- | --- | --- | --- | --- | --- |
|  | Kind | bp (°C.) | pKa | Amount (μeq/g) | Gelation | Coloration | Coating film |
| Ex. 35 | Triethylamine | 89.6 | 10.67 | 30 | Did not gel longer than 6 months | Pale yellow | Almost not colored, transparent |
| Ex. 36 | Triethylamine | " | " | 150 | Did not gel longer than 6 months | Pale yellow | Almost not colored, transparent |
| Ex. 37 | N—methyl-pyrrolidine | 79 to 81 | 10.17 | 5 | Did not gel longer than 6 months | Pale yellow | Almost not colored, transparent |
| Ex. 38 | N,N—dimethyl-benzylamine | 181 | 8.93 | 150 | Did not gel longer than 6 months | Pale yellow | Almost not colored, transparent |
| Ex. 39 | N,N—dimethyl-benzylamine | " | " | 750 | Did not gel longer than 6 months | Pale yellow | Almost not colored, transparent |
| Ex. 40 | Tri-n-butylamine | 156.5 | 10.65 | 30 | Did not gel longer than 6 months | Pale yellow | Almost not colored, transparent |
| Com. Ex. 14 | — | — | — | — | Gelation occurred after 8 days. | Colorless, transparent | Colorless, transparent |
| Com. Ex. 15 | Sodium carbonate | — | — | 500 | Gelation occurred after 10 days. | Cloudy | Cloudy |
| Com. Ex. 16 | n-Propylamine | 48 | 10.57 | 30 | Gelation occurred after 11 days. | Yellowish brown | Brown |
| Com. Ex. 17 | Di-n-propylamine | 109.4 | 11.00 | 30 | Gelation occurred after 45 days. | Yellowish brown | Brown |
| Com. | N—methyl- | 202 | 0.32 | 150 | Gelation | Brown | Brown |

TABLE 8-continued

| | Basic substance | | | Composition | | |
|---|---|---|---|---|---|---|
| Kind | bp (°C.) | pKa | Amount (μeq/g) | Gelation | Coloration | Coating film |
| Ex. 18 pyrrolidone | | | | occurred after 7 days. | | |

In addition to the ingredients used in the Examples, other ingredients can be used in the Examples as set forth in the specification to obtain substantially the same results.

What we claim is:

1. A composition suitable for forming which comprises
   (1) an alternating copolymer comprising chlorotrifluoroethylene and 2,2,3,3-tetrafluoropropyl vinyl ether; and
   (2) a methyl methacrylate polymer comprising predominantly methyl methacrylate.

2. The composition of claim 1, wherein the ratio of the alternating copolymer to the methyl methacrylate polymer is from 1/9 to 9/1 by weight.

* * * * *

UNITED STATES PATENT AND TRADEMARK OFFICE
CERTIFICATE OF CORRECTION

PATENT NO. : 4,622,364
DATED : November 11, 1986
INVENTOR(S) : Akira Ohmori et al It is certified that error appears in the above-identified patent and that said Letters Patent is hereby corrected as shown below:

Column 10, line 54, "b 1/1" should read -- 1/1 --.

Signed and Sealed this

Sixteenth Day of February, 1988

Attest:

DONALD J. QUIGG

*Attesting Officer*     *Commissioner of Patents and Trademarks*